(12) United States Patent
Fiegler

(10) Patent No.: US 11,945,622 B2
(45) Date of Patent: Apr. 2, 2024

(54) CENTERING CONE FOR FIXING AN UPRIGHT CONTAINER

(71) Applicant: KRONES AG, Neutraubling (DE)

(72) Inventor: Rudolf Fiegler, Regensburg (DE)

(73) Assignee: KRONES AG, Neutraubling (DE)

( * ) Notice: Subject to any disclaimer, the term of this patent is extended or adjusted under 35 U.S.C. 154(b) by 405 days.

(21) Appl. No.: 17/298,521

(22) PCT Filed: Oct. 17, 2019

(86) PCT No.: PCT/EP2019/078135
§ 371 (c)(1),
(2) Date: May 28, 2021

(87) PCT Pub. No.: WO2020/108843
PCT Pub. Date: Jun. 4, 2020

(65) Prior Publication Data
US 2022/0024626 A1     Jan. 27, 2022

(30) Foreign Application Priority Data
Nov. 28, 2018   (DE) ............... 20 2018 106 765.6

(51) Int. Cl.
| B65C 3/26 | (2006.01) |
| B65C 9/04 | (2006.01) |
| B65C 9/06 | (2006.01) |
| B65G 47/86 | (2006.01) |

(52) U.S. Cl.
CPC ............ B65C 3/26 (2013.01); B65C 9/04 (2013.01); B65C 9/06 (2013.01); B65G 47/847 (2013.01)

(58) Field of Classification Search
CPC .... B65C 3/26; B65C 9/04; B65C 9/06; B65G 47/847
USPC ........................................ 198/471.1
See application file for complete search history.

(56) References Cited

U.S. PATENT DOCUMENTS

| 3,534,710 A * | 10/1970 | Olde .................. A01K 39/02 222/422 |
| 10,773,446 B2 * | 9/2020 | Bast .................... B67C 3/08 |
| 2002/0166640 A1 * | 11/2002 | Caprara ............... B65C 9/045 156/556 |

(Continued)

FOREIGN PATENT DOCUMENTS

| DE | 19844366 A1 * | 4/1999 | ............ B29C 47/68 |
| EP | 1251074 A2 | 10/2002 | |
| EP | 2332845 A2 | 6/2011 | |

(Continued)

OTHER PUBLICATIONS

ISA European Patent Office, International Search Report Issued in Application No. PCT/EP2019/078135, dated Jan. 22, 2020, WIPO, 2 pages.

(Continued)

Primary Examiner — James R Bidwell
(74) Attorney, Agent, or Firm — McCoy Russell LLP

(57) ABSTRACT

The present invention provides a centering cone for fixing a container, in particular a container standing on a centering plate, and for supplying clean air into the container through an air outlet of the centering cone so as to increase the internal pressure of the container. The air outlet is defined by a passage opening with a screen or by at least two individual passage openings.

20 Claims, 3 Drawing Sheets

(56) References Cited

U.S. PATENT DOCUMENTS

2006/0113024 A1* 6/2006 Panzetti ................. B65C 3/065
53/399
2015/0060240 A1* 3/2015 Peutl ........................ B65C 9/04
269/25

FOREIGN PATENT DOCUMENTS

EP  2845813 A1  3/2015
FR  2779668  * 12/1999  ............... B08B 9/08

OTHER PUBLICATIONS

ISA European Patent Office, Written Opinion of the International Searching Authority Issued in Application No. PCT/EP2019/078135, dated Jan. 22, 2020, WIPO, 5 pages.

* cited by examiner

CENTERING CONE FOR FIXING AN UPRIGHT CONTAINER

CROSS REFERENCE TO RELATED APPLICATIONS

The present application is a U.S. National Phase of International Application No. PCT/EP2019/078135 entitled "CENTERING CONE FOR FIXING AN UPRIGHT CONTAINER," and filed on Oct. 17, 2019. International Application No. PCT/EP2019/078135 claims priority to German Patent Application No. 20 2018 106 765.6 filed on Nov. 28, 2018. The entire contents of each of the above-listed applications are hereby incorporated by reference for all purposes.

TECHNICAL FIELD

The present invention relates to a centering cone for fixing a container, in particular a container standing on a centering plate, and for supplying clean air into the container through an air outlet of the centering cone so as to increase the internal pressure of the container.

BACKGROUND AND SUMMARY

In labeling empty containers or, also quite generally, in processing empty containers, in particular PET containers, upright containers are usually fixed with a centering cone by the centering cone applying pressure to the container from above so that the container is jammed between the support surface and the centering cone. In particular, due to the shape of the centering cone tapering towards the container, the container cannot shift sideways under normal production conditions, because the centering cone projects a short distance into the neck of the bottle.

Container processing machines (also simply referred to as machines hereinafter), such as labeling machines, include at least one processing station to which the containers are conveyed, usually standing on centering plates and each fixed with a centering cone. Here, the centering plates and the centering cones run synchronously. In many cases, the machines include conveying carousels in which a plurality of centering plates and centering cones are arranged to rotate around a rotary axis. The containers, standing on the centering plates, then travel along part of a circular path past the processing station(s). In the case of labeling machines, the conveying carousel is also referred to as a labeling carousel, because containers are labeled while they are being conveyed in this carousel.

During operation, the container is acted upon by air, which is fed thereto through the centering cone. This serves to stabilize the container through the increased internal pressure. This stabilization prevents the container from being compressed and thus damaged, when the centering cone applies pressure to the container, in particular when the centering cone is lowered onto the container so as to fix the container. For sufficient stabilization, a minimum volume of air must be introduced into the container so that a predetermined minimum pressure will be built up in the container within a predetermined time. The centering cone can thus be regarded as a nozzle.

The air is first supplied to the stationary part of the machine. Typically, the air passes through a filter unit as it enters the machine. If the machine has a conveying carousel, the filtered air is subsequently transferred, e.g. via a rotary air distributor, from the stationary part of the machine to the rotatable carousel, where it is conducted to the centering cones by means of a distributor.

Each centering cone may be configured and arranged in such a way that the air duct is switched open by a mechanical lifting mechanism when the centering cone is placed onto the container.

In the case of this arrangement, abrasion occurs in movable and especially rotating parts, e.g. in the centering cones, and, if fitted, in the rotary air distributor. Foreign particles originating from the abrasion will thus enter the air stream of the air flowing through the machine. However, as far as possible, such foreign particles should not enter the container, especially in food processing.

Some means by which it might be possible to prevent an ingress of foreign particles in the container have, however, the effect that the air flow will no longer reliably suffice to stabilize the containers.

It follows that, in the case of the known systems, the problem arises that it cannot be ensured to a sufficient extent that foreign particles originating from abrasion will not enter the container together with the air flow and that, at the same time, a sufficient amount of air will enter the containers for stabilization.

Hence, the task underlying the invention is to allow a sufficient amount of air to enter the containers for stabilization and to simultaneously prevent foreign particles originating from abrasion from entering the container together with the air flow.

In the case of a centering cone for fixing a container, in particular a container standing on a centering plate, and for supplying clean air (also referred to as sterile air) into the container through an air outlet of the centering cone so as to increase the internal pressure of the container, the problem is solved in that the air outlet is defined by a passage opening with a screen, or in that the air outlet is defined by at least two individual passage openings.

In other words, the centering cone is, in both alternatives, configured such that the flow cross-section narrows before the air exits the centering cone.

The advantage of one, and in particular of a single, passage opening with a screen is that the air flow will hardly be obstructed by such a passage opening and that, in this way, a sufficient amount of air can flow out of the centering cone to stabilize the container, while ensuring at the same time that foreign particles will sufficiently be retained.

The advantage of at least two individual passage openings is that, for a given total cross-sectional area of the openings, the passage openings can each have a smaller diameter than a single passage opening. Foreign particles will be retained better in this way.

This alternative can be regarded as a centering cone having a screen-like element that is formed integrally with the body of the centering cone. The passage openings then correspond to the meshes of the screen. The advantage of such a plurality of passage openings is also that contaminations that may be caused during installation of a screen can be avoided and that faulty assembly is impossible.

The number of passage openings is essentially determined by how large their diameter should be and how much air should exit through the air outlet. That is, the smaller the openings are, the more openings may be provided.

In the present application, a centering cone is understood to be an element whose body has at least one portion with a tapering lateral surface as well as a lower base and an upper base, i.e. a portion with a frustoconical shape, wherein the lower base of the frustrum may, for example, be a circular area. The term "cone" does not exclude that the element has also portions where the body does not have a conical shape. For example, the frustoconical portion may adjoin a portion that has a different shape. The only restriction here is that the frustrum has a free end on the side with the upper base, i.e. that no other portions adjoin the frustrum on this side, and that this side forms an end of the centering cone. This means that the centering cone end interacting with the containers has a shape that tapers towards the containers. This end of the centering cone can thus protrude into the container and center and stabilize it in this way.

The air outlet is formed in the body of the centering cone and extends from the interior of the centering cone towards the upper base of the frustrum.

The centering cone is additionally provided with an air inlet. Also the air inlet is formed in the body of the centering cone and in the form of at least one passage opening. The air inlet and the air outlet are in fluid communication with one another.

Hence, the centering cone is configured such that air can flow into the interior of the centering cone through the air inlet, pass through the interior of the centering cone, and flow out of the interior of the centering cone through the air outlet.

The term passage opening describes a passage formed in a piece of material, here in the body of the centering cone, which is configured in such a way that air can flow therethrough, the passage in the air outlet extending from the interior of the centering cone outwards, e.g. up to the upper base of the frustrum.

The passage opening may have a circular cross-sectional area. Other shapes of the cross-sectional area, in particular polygonal or elliptical, are also imaginable.

The passage opening may have a constant diameter along its length or a variable diameter, in particular it may be configured such that it tapers from the inside of the centering cone towards the outside. For a non-circular cross-section, the length of the ellipse half-axis or the longest diagonal is here considered to be the diameter. The diameter at the narrowest point along the length of the passage opening is referred to as the minimum diameter of the passage opening. The passage opening may be configured such that the cross-section of the passage opening has the minimum diameter at the outer end of the passage opening, when seen in relation to the body of the centering cone.

A screen is an element having meshes of a certain mesh width, through which meshes air can flow. The mesh width determines which foreign particles are retained or pass through the screen. The screen may have a great variety of configurations, in particular it may comprise a perforated plate, a material web or a grid, each of which comprises the screen meshes. The screen part comprising the meshes may be formed of metal, plastic, or a fibrous fabric, by way of example. The screen preferably has a mesh width in the range of 50 µm and 2000 µm, in particular 200 µm and 1000 µm, in particular 300 µm and 800 µm.

It goes without saying that the screen is configured and arranged in such a way that all air flowing through the air outlet will pass through the screen. This means that the air cannot flow past the screen. In other words, the screen extends across the entire cross-section of the passage opening.

The air outlet, and thus also the screen, may be arranged downstream of all moving parts of the centering cone, when seen in relation to the flow direction of the air during proper operation.

The screen may be adapted to be releasably fixed at the operating position, in particular by means of a toolless connection, e.g. a plug connection. This makes it possible to replace the screen, for example due to wear or in view of a change in technical requirements, and/or to remove the screen for cleaning and/or maintenance.

The operating position is in this case the position at which the screen is properly arranged during operation so that foreign particles will be retained, in particular the position at which the screen extends across the entire cross-section of the passage opening.

The screen may be formed from a material corresponding to or differing from the material of the body of the centering cone.

The use of the same material is advantageous insofar as it can be ensured that temperature changes will not lead to unsatisfactory sealing between the body of the centering cone, i.e. the inner wall of the passage opening, and the screen due to different coefficients of thermal expansion.

The use of different materials is advantageous insofar as the most suitable material can be selected for the screen and for the body of the centering cone, and insofar as in particular a material can be used for the screen, which allows the mesh width of the screen to be produced advantageously in the required size.

When the centering cone according to a second alternative comprises the at least two individual passage openings, the passage openings may be configured such that, when air flows simultaneously through each of the passage openings with a maximum volume flow limited by the shape of the passage openings, the sum of the volume flows will be greater than or equal to a predetermined minimum volume flow, in particular the volume flow required to increase the internal pressure of the container, which ensures stabilization of the container during fixing by means of the centering cone. In particular, the predetermined minimum volume flow is predetermined in such a way that a predetermined minimum pressure (internal pressure) will be generated in the container within a predetermined time. In particular, the minimum volume flow may be predetermined such that it will be suitable for building up an internal pressure of 0.5 to 0.8 bar in the container within a period of 50 to 100 ms.

The shape of each of the passage openings may be such that it prevents certain foreign particles contained in the air flow from exiting the centering cone in the direction of the container.

How this shape is determined depends e.g. on the kind of foreign particles that are to be prevented from exiting.

This shape may e.g. be of such a nature that the flow behavior of the air into and through the passage openings will be such that at least a predetermined percentage of the particles contained in the air flow will deposit on the inner side of the body of the centering cone, in particular on and in the passage opening.

As regards the shape of the passage openings, in particular the values of the following parameters may be selected or combined in such a way that certain foreign particles contained in the air flow will exit the centering cone in the direction of the container: the minimum diameter of the passage openings and/or the maximum diameter of the passage openings and/or the length of the passage openings and/or the changes in diameter along the passage openings and/or the diameter of the passage openings at one of the ends or both ends of the respective passage opening.

Each of the passage openings may have a minimum diameter, which is smaller than or equal to 4 mm, in particular smaller than or equal to 3 mm and larger than or equal to 1 mm, in particular about 2 mm. This allows a sufficient amount of air to flow through the passage openings, while retaining to a sufficient degree the foreign particles to be retained.

The sum of the minimum cross-sectional areas of each of the passage openings may be greater than or equal to a cross-sectional area that would be obtained for a passage opening having a diameter of 4 mm to 8 mm, in particular 5 mm to 7 mm, in particular 6 mm.

The diameter of each of the passage openings may be constant along the respective passage opening, and the sum of the cross-sectional areas of all the passage openings may be greater than or equal to a cross-sectional area that would be obtained for a single passage opening having a diameter of 4 mm to 8 mm, in particular 5 mm to 7 mm, in particular 6 mm.

All passage openings may have the same diameter and in particular the same length. Such a configuration is easy to manufacture and leads to a uniform flow pattern and a similar restraining effect among the respective passage openings.

At least one, in particular each passage opening may have a shape tapering outwards, i.e. towards the container side during operation. This has a positive effect on the air flow as regards the stabilizing effect.

It goes without saying that, in principle, a screen according to the first alternative may also be provided in the case of the above-described configuration with a plurality of passage openings.

BRIEF DESCRIPTION OF THE FIGURES

Additional features and advantages will be explained hereinafter making reference to the exemplary figures, in which.

DETAILED DESCRIPTION

Figure 1:
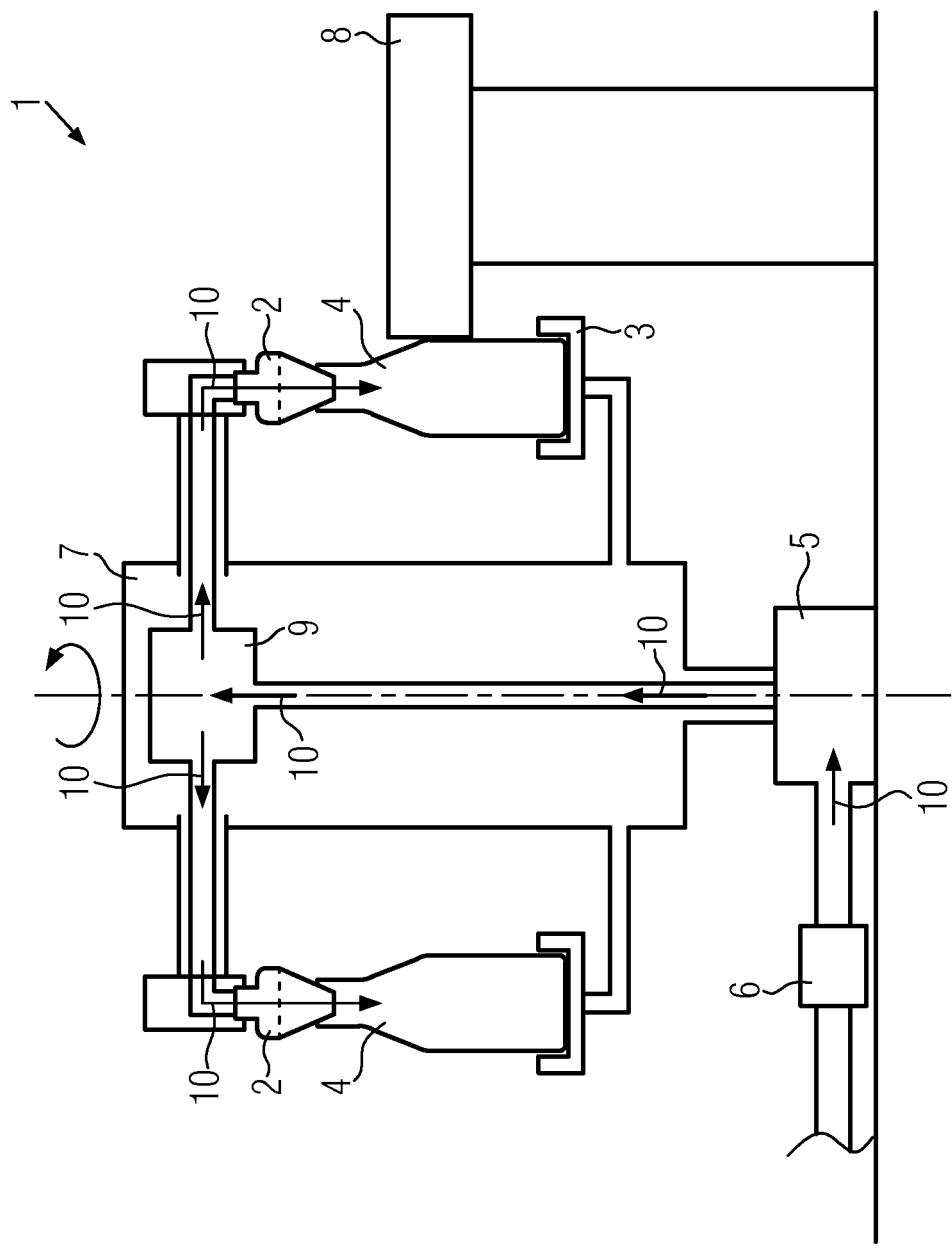
FIG. 1 shows a schematic, not to scale, cross-sectional view of a labeling machine including a centering cone.

FIG. 1 shows exemplarily a cross-section of a labeling machine 1 with centering cones 2 and a centering plate 3. In the figure, it is also shown that a respective container 4 stands on each of the centering plates and is fixed from above by means of the centering cone. For this purpose, one end of the centering cone, namely the end towards which the nozzle head tapers, is inserted into the neck of the bottle.

In addition, a rotary air distributor 5 is shown, which has supplied thereto air filtered through an input filter 6 and which transfers this air from the stationary part of the labeling machine to the rotatable labeling carousel 7. The labeling carousel comprises the centering cones and the centering plates and conveys, during operation, the containers, standing on the centering plates and fixed by the centering cones, along part of a circular path to the labeling unit 8. The labeling unit is arranged on the periphery of the labeling carousel and applies labels to the containers while the containers stand on the centering plate and are fixed by the centering cones. In particular, the containers can also be rotated about their longitudinal axis by means of the centering plates, for example when they are being labeled with wrap-around labels.

The labeling carousel includes an air distributor 9 (annular distributor). The latter distributes the air such that it will flow to the centering cones.

Each centering cone can be configured such that the supply of air from the annular distributor to the container is activated by means of a lifting mechanism, when the centering cone is placed onto the container. The lifting mechanism allows the air supply to the container to be activated without a control, merely by placing the container.

For example, the centering cone may be configured and arranged in operation such that it includes a portion that is displaceable in a vertical direction. This portion may be configured such that (in an operating position) it is lifted from a rest position by a container occupying a working position (i.e. a position below the centering cone). The centering cone then comprises a blocking element, e.g. a ball, which, in a rest position of the displaceable portion, is held in a blocking position by the force of gravity and, optionally, additionally by a spring. The blocking position is a position in which the blocking element blocks the air supply from the annular distributor. The centering cone is then configured such that, by lifting the displaceable portion from the rest position, the blocking element will be lifted from the blocking position to a passing position. The passing position is a position in which the blocking element no longer blocks the air supply, so that air from the annular distributor can flow through the centering cone. For example, the air flow path may have provided therein a restriction that is completely blocked from above by the blocking element, when the blocking element occupies the blocking position, and will be unblocked when the blocking element is lifted.

The rotary air distributor 5 may, for example, be located below the carousel, as shown here. When the air is supplied to the carousel from below, it can, for example, be conducted upwards through the center shaft to the air distributor 9 of the carousel. In this case, the center shaft is configured as a hollow shaft that has an air duct for the air to be distributed.

The direction of air flow through the labeling machine is indicated by arrows 10.

Alternatively, the air can be conducted directly from the rotary distributor to the annular distributor through an air hose, instead of passing it through an air duct in the center shaft. In principle, the center shaft may be configured as a hollow shaft also in this case, and the air hose may be routed through the hollow shaft. The air hose may e.g. be made of plastic, such as PTFE. The air hose may e.g. have a diameter between 0.2 and 1 inch, in particular 0.4 and 0.8 inches, in particular 0.5 inches. In order to retain the air hose in position, it may be screw-fastened at both ends, preferably to the upper area of the rotary air distributor 5 and/or to the lower area of the air distributor 9.

In such a labeling machine, the centering cones according to the present invention described hereinafter or centering cones according to the present invention having a different configuration may be used. It goes without saying that these centering cones may also be used in other machines.

Figure 2B:
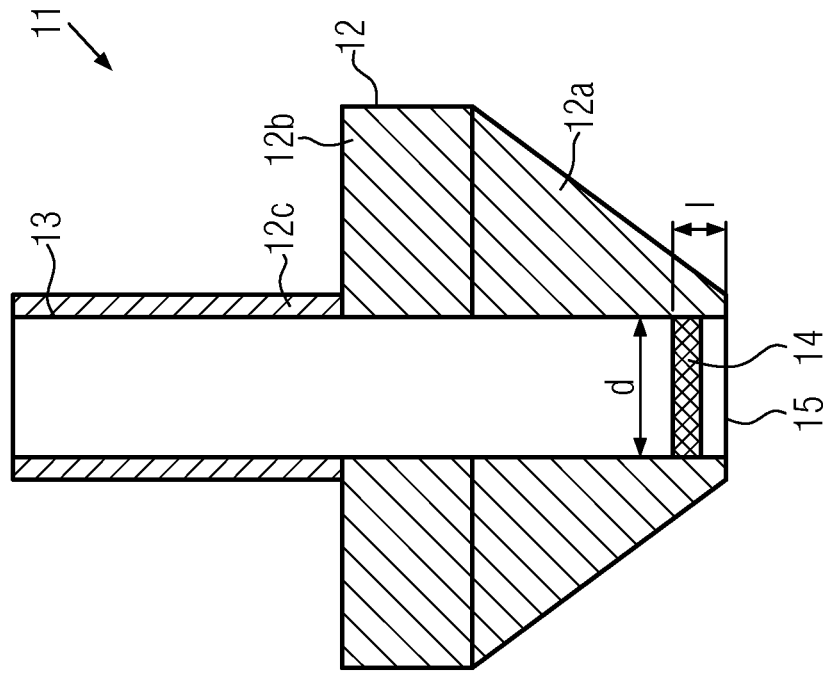
FIGS. 2A and 2B show schematic, not to scale, oblique and cross-sectional views of a centering cone according to a first embodiment.
Figure 2A:
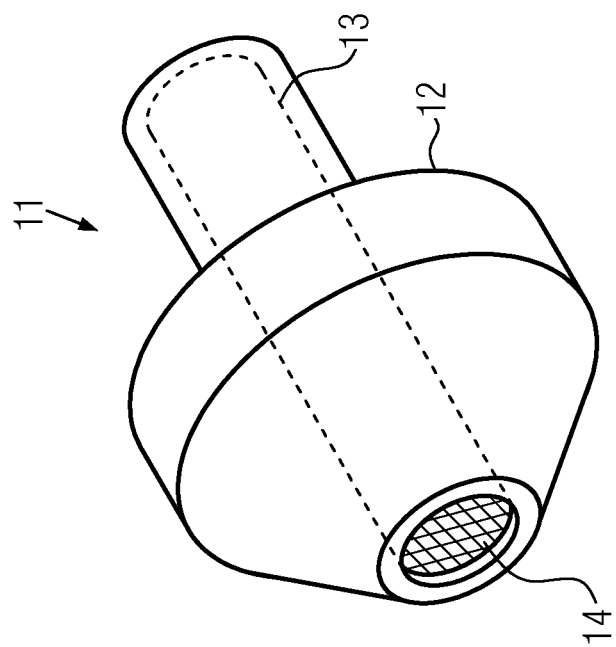

FIGS. 2A and 2B show an oblique view and a cross-section of a centering cone 11 according to a first embodiment of the invention. The body 12 of the centering cone has an air duct 13 formed therein, which here extends along a longitudinal axis of the centering cone inside the centering cone.

It can be seen in the figures that, in the present example, the centering cone comprises a portion 12a having a frustoconical shape with a circular cross-section and a plurality of portions 12b, 12c having a cylindrical shape, the cylindrical portions adjoining the lower base of the frustoconical shape. However, this is purely exemplary and a great variety of other shapes of the centering cone are imaginable, for example shapes with a non-circular cross-sectional area.

The air outlet 14 of the centering cone is arranged at the end of the centering cone towards which the body, in particular the portion with the frustoconical shape, of the centering cone tapers, this end being the container-side end in operation.

Here, the centering cone has an air outlet defined by precisely one passage opening and a screen 15 arranged therein. The screen may be fixed, in particular releasably fixed, at the operating position.

The passage opening has here, exemplarily, a circular cross-section having a constant diameter d along its entire length l, other shapes being, however, imaginable as well.

When air flows through the air outlet into the container, it will also flow through the screen arranged in the passage opening. The screen prevents certain foreign particles in the air flow from entering the container insofar as these foreign particles are retained by the screen. In particular, the foreign particles are thus prevented from leaving the centering cone during normal operation. The mesh width of the screen can be selected according to the expected abrasion, in particular according to the expected size of the foreign particles.

Figure 3B:
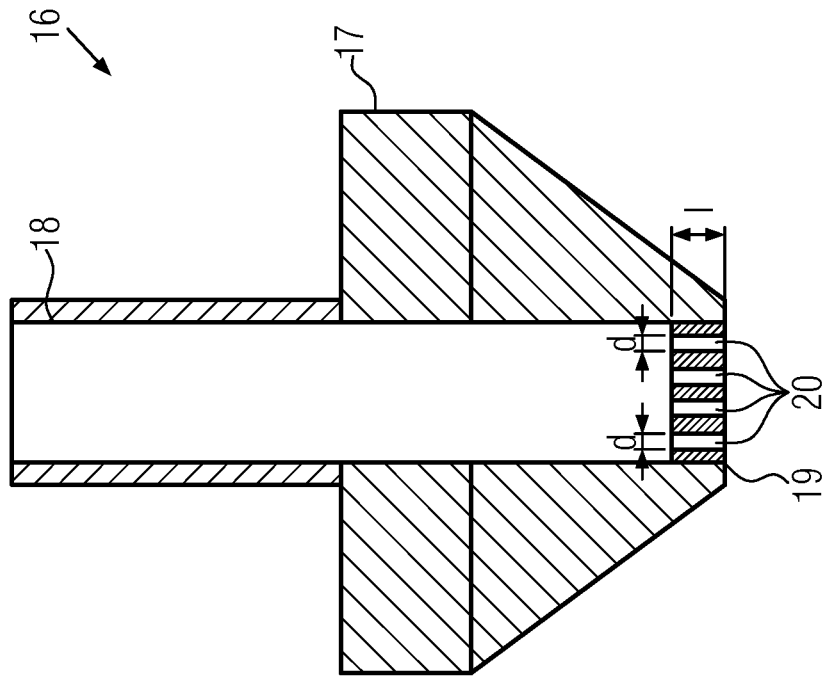
FIGS. 3A and 3B show schematic, not to scale, oblique and cross-sectional views of a centering cone according to a second embodiment.
Figure 3A:
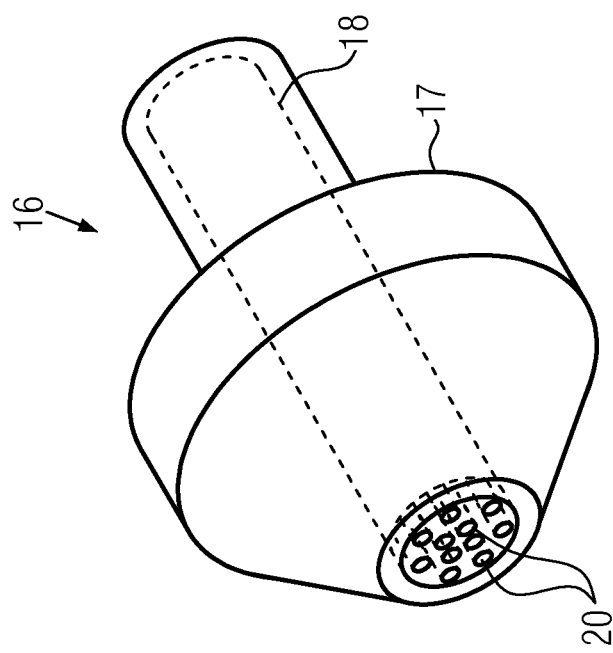

FIGS. 3A and 3B show an oblique view and a cross-section of the centering cone 16 according to a second embodiment. As in the first embodiment, the body 17 of the centering cone has formed therein an air duct 18 also in this case. Also in this case, the air outlet 19 of the centering cone is arranged at the end of the centering cone towards which the centering cone tapers, which is the container-side end during operation.

Differently from the first embodiment, the centering cone here has an air outlet defined by a plurality of passage openings 20. A screen is not provided here, although that would also be imaginable as an option.

In the present example, the passage openings each have a circular cross-sectional area and a constant diameter d along their length l. However, other shapes are imaginable as well.

It goes without saying that features referred to in the above-described embodiments are not limited to these special combinations and are also possible in arbitrary other combinations.

The invention claimed is:

1. A centering cone for fixing a container, and for supplying clean air into the container through an air outlet of the centering cone so as to increase an internal pressure of the container,
wherein
the air outlet is defined by a passage opening with a screen, and wherein the screen has a mesh width in the range of 50 µm to 2000 µm, or
the air outlet is defined by at least two individual passage openings, wherein the at least two individual passage openings are configured such that, when air flows simultaneously through each of the passage openings with a maximum volume flow limited by the shape of the passage openings, the sum of the volume flows will be greater than or equal to a predetermined minimum volume flow.

2. The centering cone according to claim 1, comprising the screen, wherein the screen is adapted to be releasably fixed at an operating position.

3. The centering cone according to claim 2, comprising the screen, wherein the screen is formed from a material corresponding to or differing from the material of a body of the centering cone.

4. The centering cone according to claim 1, wherein the shape of each of the passage openings prevents foreign particles contained in the air flow from exiting the centering cone in the direction of the container.

5. The centering cone according to claim 1, wherein each of the passage openings has a minimum diameter, which is smaller than or equal to 4 mm.

6. The centering cone according to claim 1, wherein the sum of the minimum cross-sectional areas of each of the passage openings is greater than or equal to a cross-sectional area that would be obtained for a passage opening having a diameter greater than or equal to 6 mm.

7. The centering cone according to claim 1, wherein the diameter of each of the individual passage openings is constant along the respective passage opening, and the sum of the cross-sectional areas of all the passage openings is greater than or equal to a cross-sectional area that would be obtained for a single passage opening having a diameter of at least 6 mm.

8. The centering cone according to claim 1, wherein all the passage openings have the same diameter.

9. The centering cone according to claim 1, wherein at least one or each of the passage openings has a shape tapering outwards, i.e. towards the container side during operation.

10. The centering cone according to claim 1, comprising the screen, wherein the screen is adapted to be releasably fixed at the operating position, by means of a toolless connection, e.g. a plug connection.

11. The centering cone according to claim 1, comprising the at least two individual passage openings, wherein the shape of each of the passage openings prevents foreign particles contained in the air flow from exiting the centering cone in the direction of the container.

12. The centering cone according to claim 1, comprising the at least two individual passage openings, wherein the sum of the minimum cross-sectional areas of each of the passage openings is greater than or equal to a cross-sectional area that would be obtained for a passage opening having a diameter greater than or equal to 6 mm.

13. The centering cone according to claim 1, comprising the at least two individual passage openings, wherein the diameter (d) of each of the individual passage openings is constant along the respective passage opening, and the sum of the cross-sectional areas of all the passage openings is greater than or equal to a cross-sectional area that would be obtained for a single passage opening having a diameter of at least 6 mm.

14. The centering cone according to claim 1, comprising the at least two individual passage openings, wherein all the passage openings have the same diameter (d).

15. The centering cone according to claim 1, wherein at least one or each of the passage openings has a shape tapering outwards, i.e. towards the container side during operation.

16. The two individual passage openings according to claim 5, wherein each of the passage openings is smaller than or equal to 2 mm and is larger than or equal to 1 mm.

17. The centering cone according to claim 8, wherein all the passage openings have the same length (l).

18. The centering cone according to claim 1, wherein the predetermined minimum volume flow is the volume flow required to increase the internal pressure of the container, which ensures stabilization of the container during fixing by means of the centering cone.

19. A centering cone for fixing a container standing on a centering plate, and for supplying clean air into the container through an air outlet of the centering cone so as to increase an internal pressure of the container,
wherein
the air outlet is defined by at least two individual passage openings, and
the shape of each of the passage openings prevents foreign particles contained in the air flow from exiting the centering cone in the direction of the container.

20. A centering cone for fixing a container standing on a centering plate, and for supplying clean air into the container through an air outlet of the centering cone so as to increase an internal pressure of the container,
wherein
the air outlet is defined by at least two individual passage openings, and
each of the passage openings has a minimum diameter, which is smaller than or equal to 4 mm, and is larger than or equal to 1 mm.

* * * * *